July 2, 1963 L. H. SAHLMANN ETAL 3,095,713
SEAL AND FLEXIBLE GEAR TYPE COUPLING
Filed Nov. 20, 1961
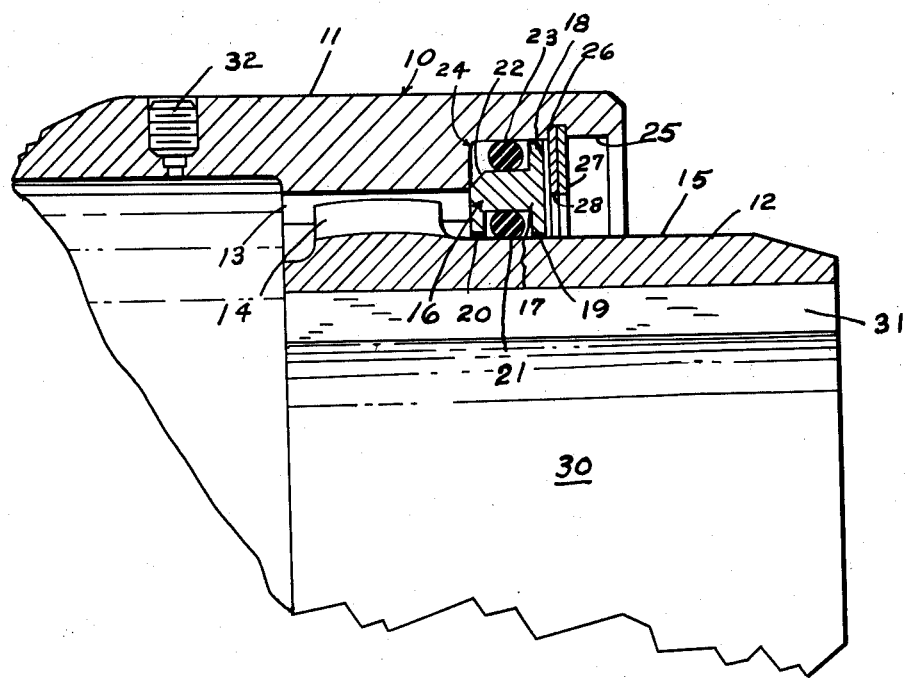
INVENTORS
LOUIS H. SAHLMANN
BY JOHN J. KANE

United States Patent Office 3,095,713
Patented July 2, 1963

3,095,713
SEAL AND FLEXIBLE GEAR TYPE COUPLING
Louis H. Sahlmann and John J. Kane, Erie, Pa., assignors to Zurn Industries, Inc., Erie, Pa., a corporation of Pennsylvania
Filed Nov. 20, 1961, Ser. No. 153,432
3 Claims. (Cl. 64—9)

This invention relates to couplings and, more particularly, to seals for use in flexible couplings of the gear type.

In Patent No. 3,001,385, a sealing ring is disclosed which is H-shaped in cross section. The present invention discloses a modified seal of the type disclosed.

The seal ring disclosed herein has one leg of the H removed and the outside edge of the bar of the H is bevelled so that the O-ring can be forced over the sealing ring without the O-ring being marred.

It is, accordingly, an object of the present invention to provide an improved seal utilizing an O-ring.

Another object of the invention is to provide an improved coupling and seal combination.

A further object of the invention is to provide a seal in combination with a coupling which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing, a coupling is shown having an improved seal thereon according to the invention.

Now with more particular reference to the drawing, a coupling 10 is shown made up of a sleeve 11 and a hub 12. The sleeve 11 is hollow and generally cylindrical and has inwardly directed spline teeth 13 which mate with crowned teeth 14 of the type shown in Patent No. 2,682,760. The sub 12 has a cylindrical surface 15 which provides a surface on which a sealing ring 16 rests.

The sealing ring 16 has an internal groove and an external flange which, in cross section, are in the form of a modified H having a bar 17, a top leg 18, and bottom legs 19 and 20. The bar 17 defined by the external flange and the leg 18 form a support for an O-ring 23. Legs 19 and 20 define an internal groove which receives an O-ring 21 which forms a seal between the bottom of the groove and the outside peripheral surface of the hub.

A corner 22 of the sealing ring 16 is chamfered so that it will easily slide under the O-ring 23 during assembly. The O-ring 23 rests on top of the bar 17 and is restrained from outward movement by the leg 18 and from inward movement by a shoulder 24.

The sleeve 11 is counterbored at 25 and the bottom of the counterbore defines the shoulder 24. The counterbore has an inner peripheral groove 26 which receives two spring washers 27 and 28. These spring washers rest in the groove 26 and extend radially inward. They form a shoulder which prevents the sealing ring 16 from outward movement and restrains the hub 12 when the teeth 14 thereof restrain the sealing ring from outward movement.

The hub 12 is generally cylindrical and has a hollow inside cylindrical surface 30 and a keyway 31 formed therein for attaching the hub 12 to a suitable shaft.

The sleeve 11 has a threaded bore therein which receives a screw 32. The screw 32 can be moved to lubricate the coupling.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A coupling comprising a hollow, generally cylindrical member having inwardly directed teeth and a counterbore in one end thereof outward of said teeth, a generally cylindrical hub having outwardly directed crowned teeth adjacent one end thereof and engaging said inwardly directed teeth, a sealing ring having a shape in cross section of an H with one outer leg removed, the inner legs thereof being adjacent the outer periphery of said hub, said sealing ring being disposed in said counterbore, the bar of said H being chamfered, an O-shaped sealing ring in the space defined by the outside bottom of said bar and the outer outwardly extending leg of said H-shaped ring, an O-ring disposed in the groove defined by said inner legs of said H-shaped sealing ring, said inner ring being slightly greater in cross sectional diameter than the distance from the outer peripheral surface of said hub to the bar of said H, an outer peripheral groove in said cylindrical member in the surface defining the counterbore thereof outwardly of said H-shaped ring, and a snap washer disposed in said groove, said snap washer extending inwardly and forming a stop, preventing said H-shaped ring from sliding outwardly.

2. A sealing ring comprising a ring generally H-shaped in cross section with one outer leg removed having an internal groove for receiving an O-ring defined by the inwardly extending legs of said H-shaped ring and the bar of said H-shaped ring, the space defined by said outer leg and said bar adapted to receive an O-ring, said bar of said H-shaped ring being chamfered whereby a second O-ring can be placed over said bar and said second O-ring can rest on said bar of said H and against the outwardly directed leg thereof and said second O-ring will not be damaged by insertion of said ring therein.

3. The sealing ring recited in claim 2 wherein said first O-ring is disposed in said internal groove and said second O-ring is disposed in said space defined by said outer leg and said bar.

References Cited in the file of this patent
UNITED STATES PATENTS

| | | |
|---|---|---|
| 2,035,171 | Loewus | Mar. 24, 1936 |
| 2,055,180 | Nelson | Sept. 22, 1936 |
| 2,886,347 | Kupchick | May 12, 1959 |
| 3,001,385 | Allen | Sept. 26, 1961 |